Figure 1:
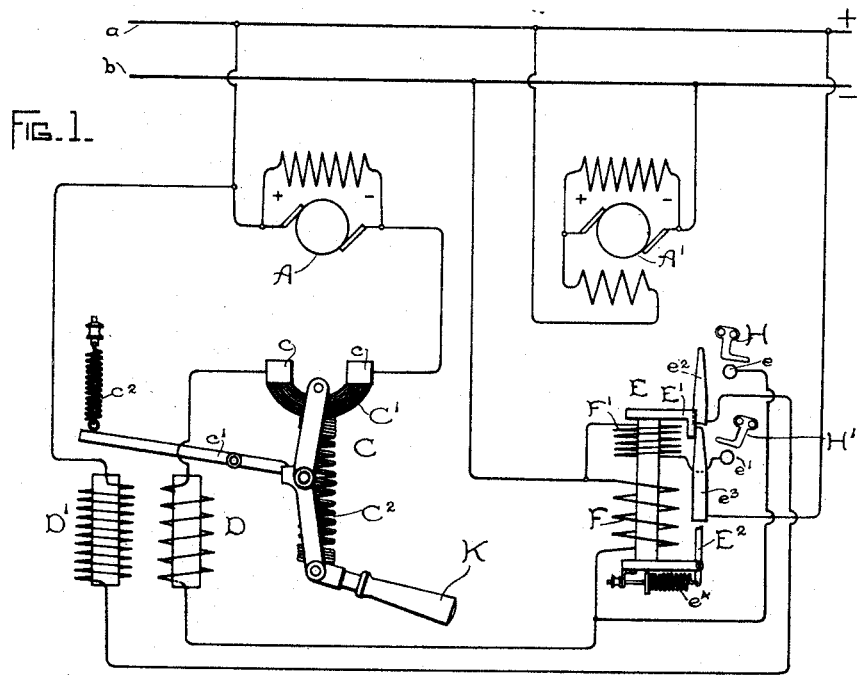

No. 630,539. Patented Aug. 8, 1899.
E. M. HEWLETT.
AUTOMATIC CIRCUIT BREAKER.
(Application filed Apr. 25, 1898.)
(No Model.)

WITNESSES
Edw. Williams Jr.
A. F. Macdonald.

INVENTOR
Edward M. Hewlett,
by Albert G. Davis.
Atty.

THE NORRIS PETERS CO., PHOTO-LITHO., WASHINGTON, D. C.

UNITED STATES PATENT OFFICE.

EDWARD M. HEWLETT, OF SCHENECTADY, NEW YORK, ASSIGNOR TO THE GENERAL ELECTRIC COMPANY, OF NEW YORK.

AUTOMATIC CIRCUIT-BREAKER.

SPECIFICATION forming part of Letters Patent No. 630,539, dated August 8, 1899.

Application filed April 25, 1898. Serial No. 678,698. (No model.)

*To all whom it may concern:*

Be it known that I, EDWARD M. HEWLETT, a citizen of the United States, residing at Schenectady, in the county of Schenectady and State of New York, have invented certain new and useful Improvements in Automatic Circuit-Breakers, (Case No. 625,) of which the following is a specification.

My invention relates more especially to the art of running dynamo-electric machines in parallel and is applicable to those cases in which it is desired to operate machines of differing characteristics in multiple on the same circuit. The invention may, however, be used in any case where it is desired to cut a source of current or a dynamo-electric machine of any type out of circuit when the current through it is reversed. For example, it often becomes necessary to run compound-wound and shunt machines in parallel, and in such cases difficulties arise owing to the difference between the characteristic curves of the machines. The nature of these curves is too well known to require description. It will suffice to say that when machines of the different characters referred to are run in parallel their respective electromotive forces will differ at certain values of the load and one of the machines will therefore be run as a motor. By the use of my invention the machine which is run as a motor will be cut out of circuit when the difference of electromotive forces has reached a certain predetermined value.

Another example of a case where my invention is of value is where one or more rotary converters are used to feed direct-current bus-bars. In such a case a rotary converter might accidentally be disconnected from its source of supply, with the result that current from the bus-bars would then return through the rotary converter and drive it as a motor. By the operation of my invention the rotary converter will then be cut out of circuit.

The invention consists in general of a device for causing the circuit of any one of a number of dynamo-electric machines running in multiple and supplying the same load to be opened when the electromotive force of that machine reaches a value which is lower by a predetermined amount than the electromotive force of the others.

The nature of the invention will be apparent from the following specification, and its scope will be particularly pointed out in the appended claims.

The accompanying drawings show an embodiment of my invention, in which—

Figure 2:
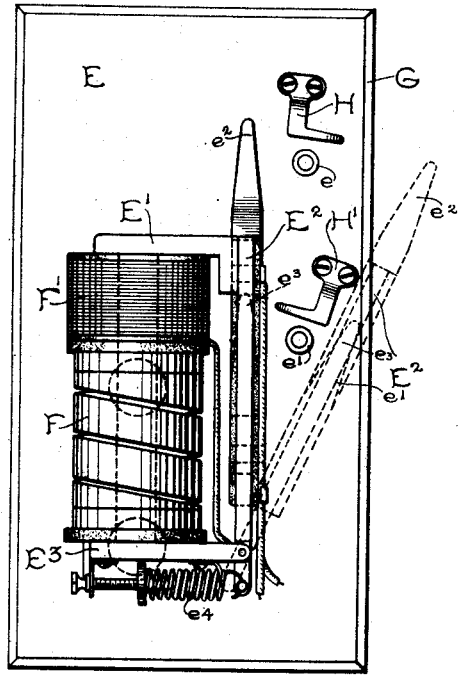
Figure 3:
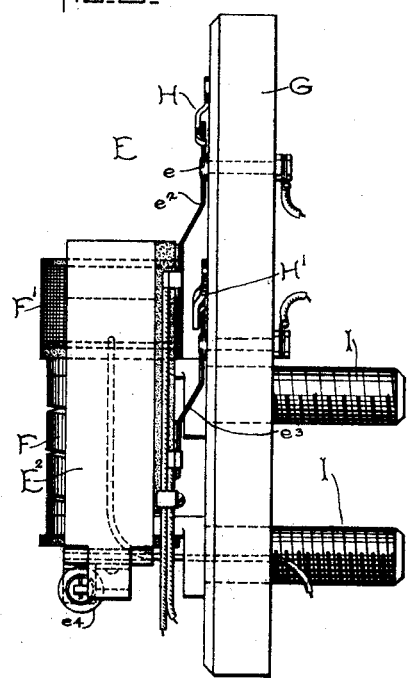
Figure 4:

Figure 1 is a diagram of the circuits. Figs. 2 and 3 are front and side elevations, respectively, of the relay device; and Fig. 4 is a detail.

The relay device E is fixed to a suitable base G, which may form an integral part of or be fixed to the switchboard. The device consists of a core about which is a series coil F and a shunt-coil F'. Attached to the upper and lower ends of the core, respectively, are arms E' and $E^3$. An armature $E^2$ is pivoted at its lower end to the arm $E^3$, with its upper end in position to be attracted by the arm E'. Some selected portion of the magnetic circuit of the relay is of hardened steel, so as to form a permanent magnet and polarize the relay. It is convenient to make the armature serve as the permanent magnet, though other parts of the magnetic circuit might serve as such instead of or in conjunction with the armature, as questions of design may dictate.

An adjustable spring $e^4$ is connected to a downward projection of the armature $E^2$ and acts to urge the upper end of the armature away from the arm E'. Two insulated spring contact-fingers $e^2$ $e^3$ are carried by the armature, as best shown in Fig. 3. These contact-fingers coöperate, respectively, with the contact-points $e$ $e'$. It is required that only one of the contact-fingers shall make contact with its contact-point when the armature moves in one direction. To accomplish this object, each of the contact-points is provided with a deflecting-guard. One of these guards is illustrated in detail in Fig. 4, which should be read in connection with Figs. 2 and 3, and consists, as will readily be seen, of a body portion extending above the level of the corresponding contact and with a downwardly-curved spring-deflector extending below the level of the surface of the contact-point. When a contact-finger moves toward one of these deflecting-guards, it will pass under the same when moving in one direction and be forced into contact, momentarily, with the corresponding contact-point, while on the return movement the contact-finger will be engaged by the deflector and will pass over the contact-point without engaging the same. The deflecting-guard H is arranged with respect to the contact-point $e$ so that the contact-finger $e^2$ makes contact therewith when falling away from the magnet-core and is prevented from making contact when moving in the opposite direction. The reverse is the case with respect to the contact-finger $e^3$. In the latter case the deflecting-guard H' is so arranged that the contact-finger $e^3$ is prevented from making contact with the contact-point $e'$ when the armature moves away from the core and is forced to make contact when the armature moves toward the core.

The relay E is electrically connected with and operates to trip a circuit-breaking mechanism, (designated in the drawings as C.) The circuit-breaker has the usual contacts $c\ c$, with the bridging-piece C', supported in position by toggle-arms operated by a handle K. A pivoted latch-lever $c'$ normally locks the toggle in position to firmly hold the bridging-piece against the contacts $c\ c$. The outer end of the latch-lever $c'$ is in position to be acted on by either of the solenoid-magnets D D' and is normally retracted by a spring $c^2$. Upon withdrawal of the latch from its locking position the contractile spring $C^2$ operates to quickly remove the bridge-piece C' and break the circuit.

The arrangement of circuits is illustrated in Fig. 1, which for purposes of illustration shows the application of my device to the case where a shunt and a compound-wound machine feed the same bus-bars. A and A' represent, respectively, a shunt and a compound-wound machine connected to bus-bars $a\ b$. The series coil F of the relay and the coil D of the circuit-breaker C are connected in series in one of the main leads of the shunt-machine A. The contact-finger $e^2$ is connected through the coil D' with one terminal of the shunt-machine, and the contact $e$ is connected through the low-resistance coil D with the other terminal. The contact $e'$ is connected through the high-resistance coil F' with one of the bus-bars, while the coöperating contact-finger $e^3$ is connected to the other bus-bar.

The operation of the device is as follows: With the parts in the position illustrated let it be assumed that the machines are working on points of their characteristic curves so related to each other that each machine gives out a fair proportion of the total energy delivered. Under these conditions the armature $E^2$ remains in position with its upper end against the arm E'. If now the load increases, the compound machine will raise the electromotive force at which the current is delivered, with the result that the shunt-machine will deliver less current because it will be working on that part of its characteristic corresponding to a higher electromotive force. Upon continued increase of load on the bus-bars the load on the compound machine will increase and the load on the shunt-machine will decrease until a point is reached where the current is reversed through the shunt-machine and it runs as a motor. The current through the coil F is normally in a direction to magnetize its already-polarized core; but upon reversal of current through the shunt-machine the current passes through the coil F in the opposite direction. When the reversed current reaches a certain predetermined value, the core is magnetized sufficiently to permit the armature under the tension of the spring $e^4$ to move away from the core into the position shown in dotted lines in Fig. 2. As the armature moves toward its dotted position the contact-finger $e^2$ will momentarily touch the contact-point $e$, thus completing the circuit from the positive bus-bar through the shunt-coil D' on the circuit-breaker C to the contact-finger $e^2$, to the contact-point $e$, and through the coil F back to the negative bus-bar. The core of the coil D' being thus energized trips the latch $c'$ of the circuit-breaker C, which then opens the circuit of the machine A.

It is desirable that before the circuit-breaker C be closed the relay should be put into condition to act in case the current should again immediately reverse. It is manifest that if current could be sent through the series coil F the core would be magnetized, so as to hold the armature in its normal position; but as this cannot be done without closing the circuit-breaker C, I have provided an additional coil F', adapted to be connected in shunt with the mains. If now the armature be moved from its dotted-line position, Fig. 2, to the full-line position shown in Figs. 1 and 2, the contact $e^3$ will pass under the guard H' and touch the contact $e'$, thus completing the circuit through the coil F' to the minus bus-bar and magnetizing the core of the coil F. The armature $E^2$ will then remain attracted. If now the circuit-breaker be closed, it will remain closed so long as the conditions are proper for normal running; but as soon as the current reverses it will open again.

The tension of the spring $e^4$ may be so adjusted as to give the desired degree of sensitiveness to the relay. The stiffer the spring the more readily does the device act. Ordinarily it is not desirable to have the circuit opened for every momentary shift of current. The relay is therefore so polarized as to hold the armature attracted with a slight or somewhat in excess of the pull of the spring. In the case of a rotary converter it is ordinarily preferred to have the pull of the spring adjusted so that it is nearly equal to the attraction of the armature at the time when there is no current in the coil F. This insures prompt opening of the circuit if the current reverses.

It is manifest that the particular arrangement of contacts on the relay forms a switch which may be useful in other relations than those described. I therefore wish it understood that the claims to this feature are not limited to these precise utilities.

What I claim as new, and desire to secure by Letters Patent of the United States, is—

1. The combination of a circuit-breaker having an overload or series coil, a shunt-coil, and a polarized relay controlling the circuit of the shunt-coil, either the shunt or the series coil acting to open the circuit-breaker.

2. A relay device comprising a polarized core, an armature, a series coil, a shunt-coil, and contacts respectively operated by the opening and closing of the armature, one set of the contacts controlling the circuit of the coil on the circuit-breaker, the other the circuit of the shunt-coil on the relay.

3. A relay device comprising a polarized magnetic circuit including an armature, a series coil in the lead to the bus-bars, a shunt-coil in an independent circuit, and means for closing the independent circuit so as to repolarize the core of the relay independently of the series coil after the core has been demagnetized by reversal of current in the latter.

4. The combination in a tripping-relay for actuating a circuit-breaker of a series coil, a shunt-coil, and a magnetic circuit formed in part of hard steel.

5. The combination with a dynamo-electric machine of a circuit-breaker therefor, a series coil or its equivalent for causing the circuit to open when the current in the dynamo-machine reverses, and means for giving an initial magnetomotive force to the magnetic circuit of the series coil while the circuit-breaker is being reset.

In witness whereof I have hereunto set my hand this 23d day of April, 1898.

EDWARD M. HEWLETT.

Witnesses:
B. B. HULL,
M. H. EMERSON.